US007982357B2

(12) United States Patent
Harris et al.

(10) Patent No.: US 7,982,357 B2
(45) Date of Patent: Jul. 19, 2011

(54) BRUSH HOLDER ASSEMBLY FOR A DYNAMO-ELECTRIC MACHINE

(75) Inventors: Curtis Harris, Anderson, IN (US); Michael McCord, Anderson, IN (US); Christopher H. Hunt, Greenfield, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 285 days.

(21) Appl. No.: 12/371,032

(22) Filed: Feb. 13, 2009

(65) Prior Publication Data

US 2010/0141082 A1 Jun. 10, 2010

(51) Int. Cl.
*H02K 13/00* (2006.01)

(52) U.S. Cl. ........ 310/239; 310/240; 310/241; 310/242; 310/244; 310/247

(58) Field of Classification Search .......... 310/238–247, 310/229
See application file for complete search history.

(56) References Cited

U.S. PATENT DOCUMENTS

| | | | | |
|---|---|---|---|---|
| 3,983,432 | A | 9/1976 | Rankin | |
| 4,876,475 | A * | 10/1989 | Smith | 310/239 |
| 5,463,264 | A * | 10/1995 | Koenitzer | 310/242 |
| 5,753,992 | A * | 5/1998 | Avitable et al. | 310/239 |
| 6,744,170 | B1 * | 6/2004 | Du et al. | 310/242 |
| 2004/0080231 | A1 * | 4/2004 | You | 310/239 |

* cited by examiner

*Primary Examiner* — Quyen Leung
*Assistant Examiner* — Jose A Gonzalez Quinones
(74) *Attorney, Agent, or Firm* — Cantor Colburn LLP

(57) ABSTRACT

A brush holder assembly for a dynamo-electric machine includes a brush fixture snap-fittingly secured to a shielding fixture. A brush member is moveably mounted within the brush fixture and includes a recessed region, and a shunt member. The shunt member includes a first end operatively connected to the brush member at the recessed region that extends through an intermediate region to a second end. A constant force spring is operatively connected between the second end section of the brush and the brush fixture. The brush holder assembly also includes a shunt retainer mounted in the brush fixture abutting the brush member. The shunt retainer includes a first leg portion, a second leg portion and a base portion. The shunt retainer is configured to maintain proper alignment of the constant force spring and prevent entanglement of the shunt member.

13 Claims, 4 Drawing Sheets

BRUSH HOLDER ASSEMBLY FOR A DYNAMO-ELECTRIC MACHINE

BACKGROUND

The subject matter disclosed herein relates to electric machines and, more particularly, to a brush holder assembly for a dynamo-electric machine.

Dynamo-electric machines, such as generators, motors, and automotive alternators, may include brushes that facilitate contact between a spinning rotor and an electrical circuit. More specifically, electrons pass from the spinning rotor through the brushes and flow into an electrical circuit that is employed, for example, to provide power to an automobile or the like. In order to provide protection from a harsh operating environment, the brushes and other associated elements, are housed in a brush holder assembly. In addition to shielding the brushes from harsh operating conditions, the brush holder assembly enhances operational life for the associated dynamo-electric machine. That is, friction resulting from contact with the spinning rotor causes the brushes to wear. If not properly fixtured, the wear would be uneven, resulting in a loss of contact between the brush(es) and the rotor. Any such loss of contact would result in machine failure.

BRIEF DESCRIPTION

According to one aspect of the exemplary embodiment, a brush holder assembly for a dynamo-electric machine includes a brush fixture having a main body portion provided with a first end portion that extends to a second end portion through an intermediate portion defining a brush chamber. The second end portion includes at least one snap element. The brush holder assembly also includes a shielding fixture detachably mounted to the brush fixture. The shielding fixture includes a main body having a first end that extends to a second end through an intermediate wall portion. The intermediate wall portion includes a brush fixture mounting section provided with at least one snap member. The at least one snap member is configured to interact with the at least one snap element to snap-fittingly secure the brush fixture to the shielding fixture. A brush member is moveably mounted within the brush chamber. The brush member includes a main body member having a first end section that extends to a second end section. The second end section includes a recessed region, and a shunt member. The shunt member includes a first end operatively connected to the brush member at the recessed region that extends through an intermediate region to a second end. A constant force spring is operatively connected between the second end section of the brush and the brush fixture. The constant force spring applies a constant force that urges the brush member toward the shielding fixture. In addition, the brush holder assembly includes a shunt retainer mounted in the brush chamber abutting the second end section of the brush member. The shunt retainer includes a first leg portion, a second leg portion and a base portion. The shunt retainer is configured to maintain proper alignment of the constant force spring and prevent entanglement of the shunt member.

According to another aspect of the exemplary embodiment, a brush holder assembly for a dynamo-electric machine includes a brush fixture having a main body portion provided with a first end portion that extends to a second end portion through an intermediate portion that defines a brush chamber. The second end portion includes at least one snap element. The brush holder assembly also includes a shielding fixture detachably mounted to the brush fixture. The shielding fixture includes a main body having a first end that extends to a second end through an intermediate wall portion. The intermediate wall portion includes a brush fixture mounting section that is provided with at least one snap member. The at least one snap member is configured to interact with the at least one snap element to snap-fittingly secure the brush fixture to the shielding fixture.

According to yet another aspect of the exemplary embodiment, a brush holder assembly for a dynamo-electric machine includes a brush fixture having a main body portion provided with a first end portion that extends to a second end portion through an intermediate portion to define a brush chamber. A shielding fixture is detachably mounted to the brush fixture. The shielding fixture includes a main body having a first end that extends to a second end through an intermediate wall portion. A brush member is moveably mounted within the brush chamber. The brush member includes a main body member having a first end section that extends to a second end section. The second end section includes a shunt member. A spring is operatively connected between the second end section of the brush and the brush fixture. The spring applies a force urging the brush member toward the shielding fixture. In addition, the brush holder assembly includes a shunt retainer mounted in the brush chamber abutting the second end section of the brush member. The shunt retainer includes a first leg portion, a second leg portion and a base portion. The shunt retainer is configured to maintain proper alignment of the constant force spring and prevent entanglement of the shunt member.

According to still another aspect of the exemplary embodiment, a brush holder assembly for a dynamo-electric machine includes a brush fixture having a main body portion provided with a first end portion that extends to a second end portion through an intermediate portion to define a brush chamber. A shielding fixture is detachably mounted to the brush fixture. The shielding fixture includes a main body having a first end that extends to a second end through an intermediate wall portion. The brush holder assembly also includes a brush member moveably mounted within the brush chamber. The brush member includes a main body member having a first end section that extends to a second end section. The second end section includes a recessed region and a shunt member. The shunt member includes a first end operatively connected to the brush member at the recessed region that extends through an intermediate region to a second end.

These and other advantages and features will become more apparent from the following description taken in conjunction with the drawings.

BRIEF DESCRIPTION OF THE DRAWING

The subject matter, which is regarded as the exemplary embodiment, is particularly pointed out and distinctly claimed in the claims at the conclusion of the specification. The foregoing and other features, and advantages of the exemplary embodiments are apparent from the following detailed description taken in conjunction with the accompanying drawings in which:

Figure 1:
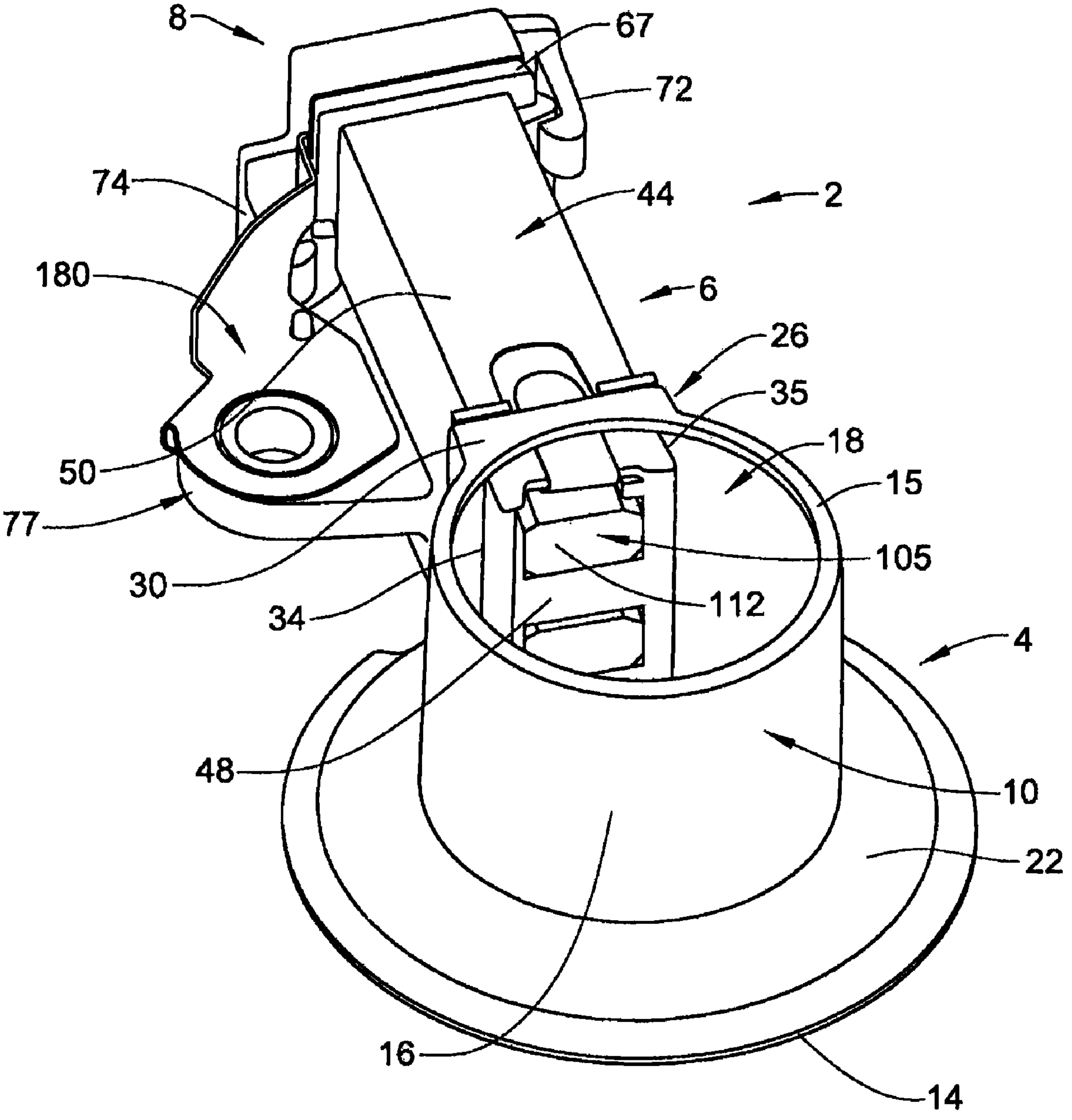
FIG. 1 is a perspective view of a brush assembly constructed in accordance with exemplary embodiments.

The detailed description explains exemplary embodiments, together with advantages and features, by way of example with reference to the drawings.

DETAILED DESCRIPTION

With initial reference to FIGS. 1-4, a brush holder assembly, constructed in accordance with exemplary embodiments, is indicated generally at 2. As will be detailed more fully below, brush holder assembly 2 includes a shielding fixture 4 that is snap-fittingly connected to a brush fixture 6. A cap member 8 is also snap-fittingly connected to brush fixture 6. In accordance with the exemplary embodiment shown, shielding fixture 4 includes a main body 10 having a first end 14 that extends to a second end 15 through an intermediate or annual wall 16 that collectively define a hollow interior 18. More specifically, first end 14 defines a base section 22 that is configured to connect with, for example, an automotive alternator. In addition, shielding fixture 4 is shown to include a brush fixture mounting frame 26 formed on annular wall 16. Brush fixture mounting frame 26 includes a spacer or wall member 30 as well a first and second snap members 34 and 35 that provide an attachment point for brush fixture 6.

In further accordance with the exemplary embodiment shown, brush fixture 6 includes a main body portion 44 having a first end portion 48 that extends to a second end portion 49 through an intermediate portion 50. First end portion 48 includes a pair of snap elements 52 and 53 that are configured to snap-fittingly engage with snap members 34 and 35 respectively. With this arrangement, brush fixture 6 is readily secured to shielding fixture 4 without the need of, for example, sonic welding, mechanical fasteners, adhesives, and the like. Brush fixture 6 is also shown to include a first brush chamber 58 and a second brush chamber 59 each of which extend between first and second end portions 48 and 49. Each brush chamber 58 and 59 includes a corresponding shunt member guide 61 and 62 respectively.

Brush fixture 6 is further shown to include a first mounting rib 66 positioned adjacent first end portion 48 and a second mounting rib 67 that is positioned adjacent second end portion 49. First mounting rib 66 extends circumferentially about first end portion 48 of brush fixture 6 and is configured to abut brush fixture mounting frame 26 in order to ensure a robust attachment. Similarly, second mounting rib 67 extends circumferentially about second end portion 49 and is configured to receive cap member 8. More specifically, cap member 8 includes a plurality of clip members 72 through 74 that are configured to snap-fittingly engage with second mounting rib 67. Brush fixture 6 is also shown to include a flange 77 which, as will be discussed more fully below, provides a mounting surface for electric connections associated with brush holder assembly 2. More specifically, brush holder assembly 2 includes first and second brush assemblies 84 and 85 that are configured to transmit electrical energy from a rotating shaft 90 (see FIG. 3) to a stationary electronic coupling. However, as each brush assembly 84 and 85 is similarly constructed, a detailed description will follow with respect to brush assembly 84 with an understanding that brush assembly 85 includes similar components.

Figure 2:
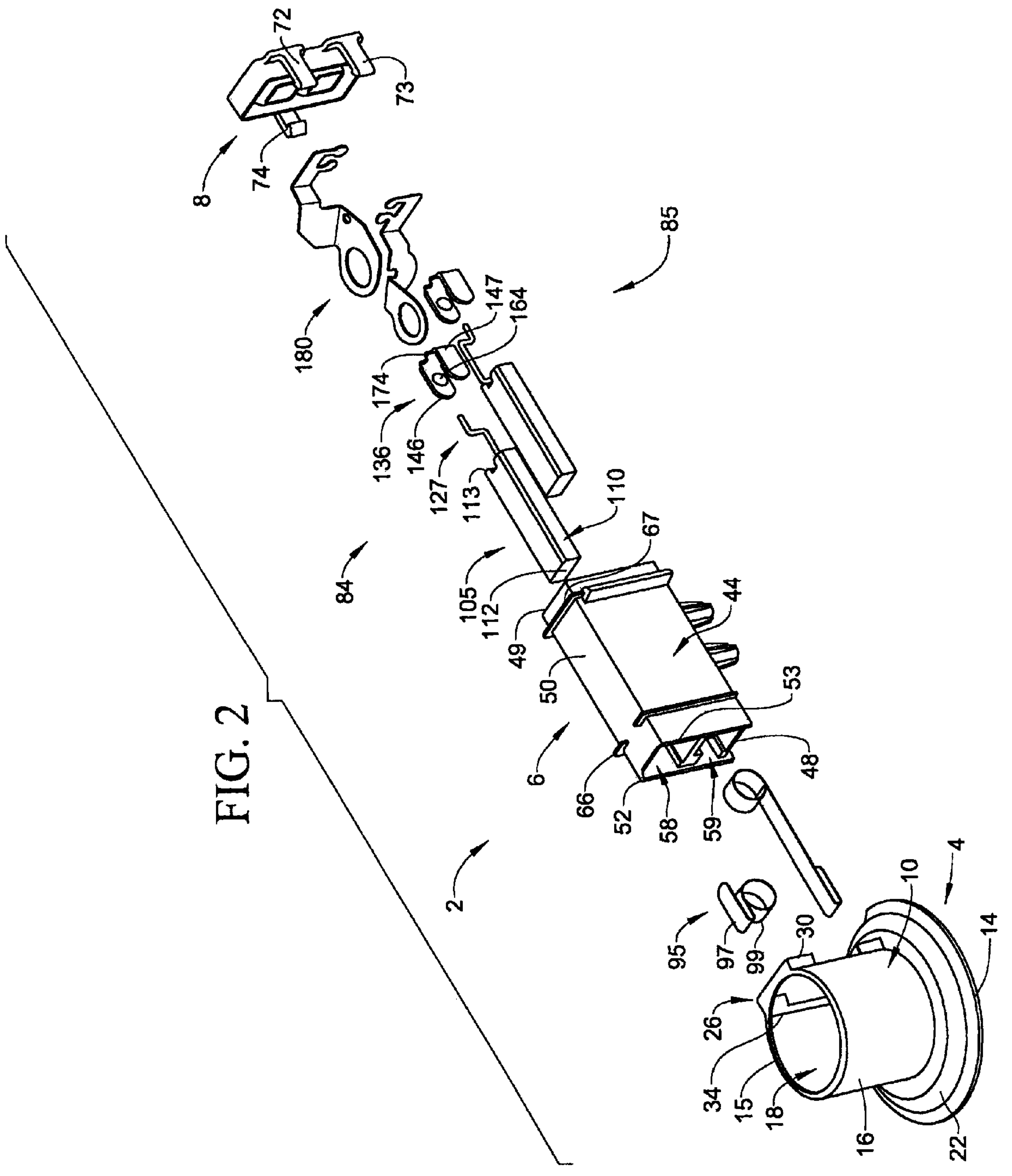
FIG. 2 is an exploded view of the brush assembly of FIG. 1.
Figure 3:
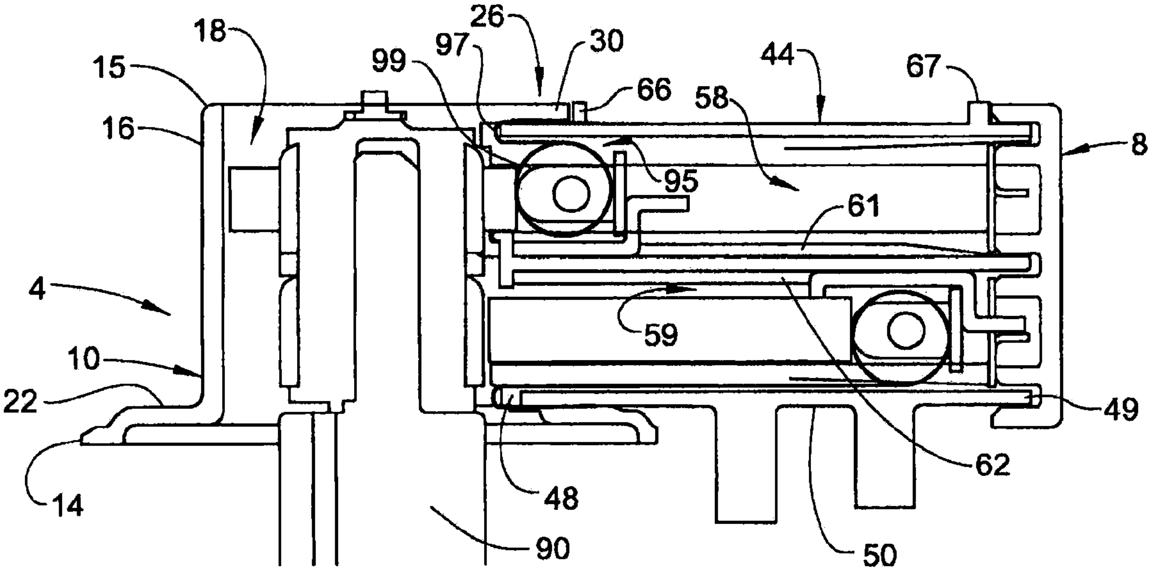
FIG. 3 is a cross-sectional, side view of the brush assembly of FIG. 1.
Figure 4:
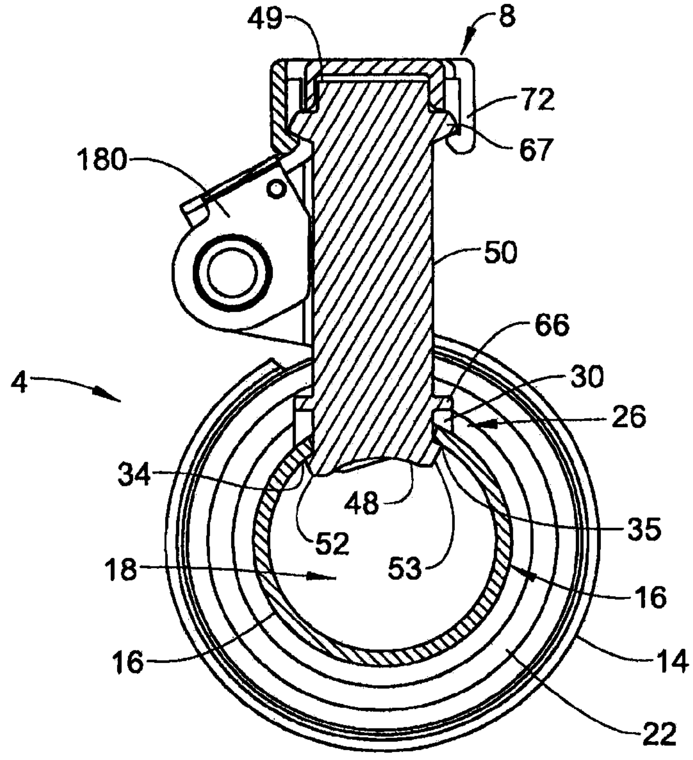
FIG. 4 is a cross-sectional, top plan view of a brush fixture portion connecting with a shield fixture portion of the brush assembly of FIG. 1.

As best shown in FIGS. 2 and 3, brush assembly 84 includes a constant force spring 95 having a leg or clip portion 97 that is configured to matingly engage with first end portion 48 of brush fixture 6. Clip portion 97 extends to a coil or brush contact portion 99. Constant force spring 95 is configured to extend and contract within first brush chamber 58. More specifically, brush contact portion 99 is configured to engage and exert a force onto a brush member 105. In this manner, constant force spring 95 ensures that brush member 105 remains in contact with the rotary component (not shown) of the associated electric machine.

Figure 5:
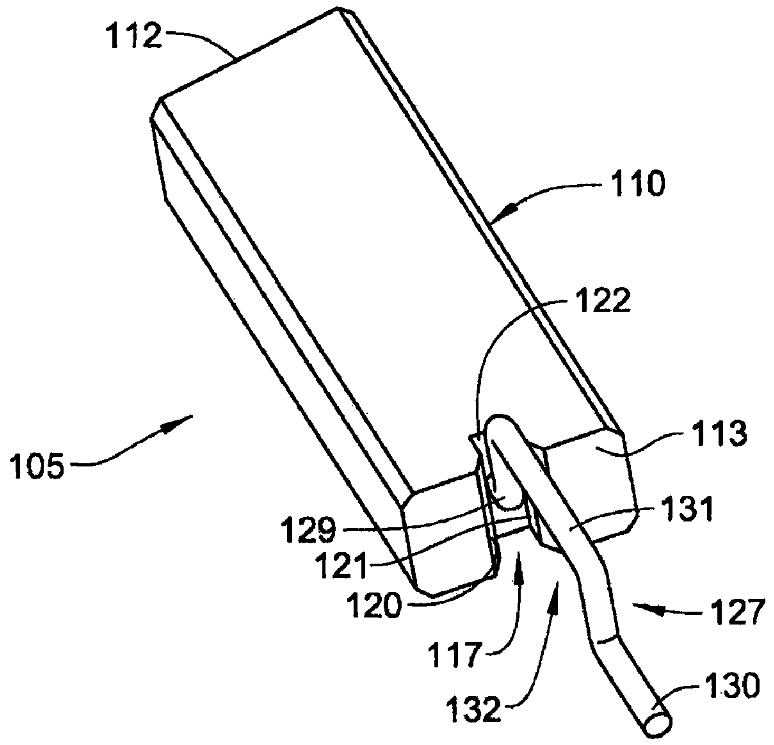
FIG. 5 is a perspective view of a brush member element of the brush assembly in accordance with exemplary embodiments.

As best shown in FIG. 5, brush member 105 includes a main body member 110 having a first end section 112 that extends to a second end section 113. Brush member 105 is also shown to include a recessed region 117 formed in second end section 113. Recessed region 117 includes a first edge portion 120, a second, opposing, edge portion 121 and a base portion 122 that collectively define a U-shaped notch 123. A shunt member 127 is electrically connected to brush member 105 at recessed region 117 and positioned, at least in part, in shunt member guide 61. More specifically, shunt member 127 includes a first end 129 that extends from base portion 122 to a second end 130 through an intermediate section 131. As will be described more fully below, intermediate section 131 includes a U-shaped bend portion 132 that resides within shunt member guide to ensure that shunt member 127 does not contact constant force spring 95. In addition to U-shaped bend 132 formed in shunt member 127, brush assembly 84 includes a shunt retainer 136 positioned at second end section 113 of brush member 105. As will be discussed more fully below, shunt retainer 136 provides additional structure that ensures shunt member 127 does not contact constant force spring 95.

Figure 6:
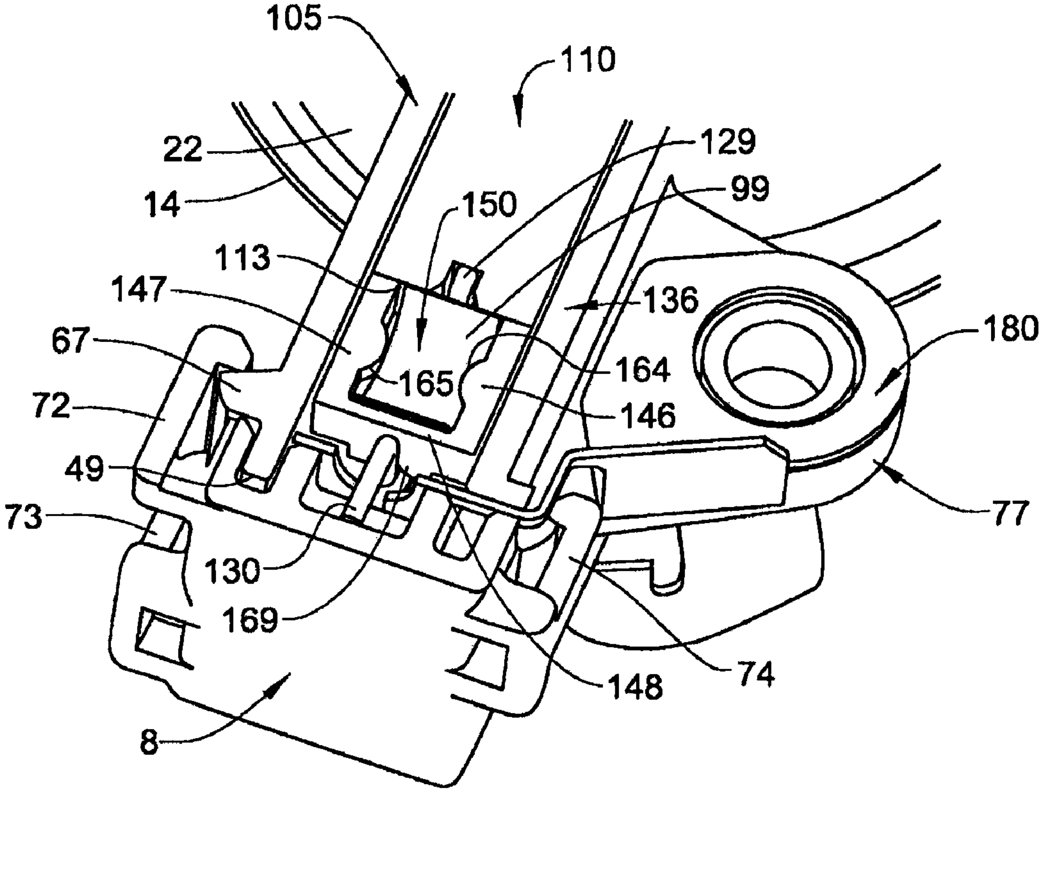
FIG. 6 is a partial cross-section view of the brush fixture portion of the brush assembly of FIG. 1 illustrating a shunt retainer element in accordance with exemplary embodiments.

As best shown in FIG. 6, shunt retainer 136 includes a first leg portion 146 that extends to a second leg portion 147 through a base portion 148 that collectively define an interior region 150. In accordance with the exemplary embodiment shown, shunt retainer 136 further includes a first locating element 164 arranged on an inner surface (not separately labeled) of first leg portion 146 and a second locating element 165 arranged on an inner surface (not separately labeled) of second leg portion 147. Each locating element 164 and 165 projects from respective ones of first and second leg portions 146, 147 into interior region 150. With this arrangement, first and second locating elements 164 and 165 are configured to retain brush contact portion 99 of constant force spring 95. That is, as brush contact portion 99 moves along first brush chamber 58, first and second locating elements 164 and 165 ensure that shunt retainer 136 moves in conjunction with brush member 105. In this manner, shunt retainer 136 ensures that shunt member 127 remains within shunt member guide 61 and out of the way of constant force spring 95. In addition to the first and second locating elements 164 and 165, shunt retainer 136 includes a recessed portion 169 formed on a first side (not separately labeled) of the base portion 148 and an alignment member 174 formed on an opposing side (not separately labeled) of base portion 158. Recessed portion 169 accommodates intermediate section 131 of shunt member 127 while alignment member 174 ensures that shunt retainer 136 does not rotate within first brush chamber 58. Finally, brush assembly 84 is shown to include a terminal member 180 that is configured to electrically interconnect with second end 130 of shunt member 127. Terminal member 180 is mounted to flange 77 and transfers electrical current from brush member 105 through shunt member 127 to particular electrical loads within, for example, an automobile.

At this point, it should be understood that the exemplary embodiment provide a simple structure for housing a brush assembly associated with a dynamo-machine. That is, by providing a snap-fitting engagement between brush fixture 6 and shield fixture 4, construction and manufacture of brush holder assembly 2 is simplified. In addition, by providing notches within brush member 105, as well as the inclusion of shunt retainers 136, additional components are not required to ensure that contact between shunt member 127 and constant force spring 95 is eliminated. Finally, while shown and described in connection with an automotive alternator, it should be readily apparent to one of ordinary skill in the art that the brush holder assembly in accordance with the exemplary embodiment could be employed in a wide variety of dynamo-electric machines.

While the exemplary embodiments have been described in detail in connection with only a limited number of embodiments, it should be readily understood that the exemplary embodiments are not limited to such disclosed embodiments. Rather, the exemplary embodiments can be modified to incorporate any number of variations, alterations, substitutions or equivalent arrangements not heretofore described, but which are commensurate with the spirit and scope of the exemplary embodiments. Additionally, while various embodiments of the exemplary embodiments have been described, it is to be understood that aspects of the exemplary embodiments may include only some of the described embodiments. Accordingly, the exemplary embodiment is not to be seen as limited by the foregoing description, but is only limited by the scope of the appended claims.

The invention claimed is:

1. A brush holder assembly for a dynamo-electric machine comprising:

a brush fixture including a main body portion having a first end portion that extends to a second end portion through an intermediate portion defining a brush chamber, the second end portion including at least one snap element;

a shielding fixture detachably mounted to the brush fixture, the shielding fixture including a main body having a first end that extends to a second end through an intermediate wall portion, the intermediate wall portion including a brush fixture mounting section provided with at least one snap member, the at least one snap member being configured to interact with the at least one snap element to snap-fittingly secure the brush fixture to the shielding fixture;

a brush member moveably mounted within the brush chamber, the brush member including a main body member having a first end section that extends to a second end section, the second end section including a recessed region and a shunt member, the shunt member including a first end operatively connected to the brush member at the recessed region that extends through an intermediate region to a second end;

a constant force spring including a leg operatively engaged with the brush fixture and a coil that abuts the second end section of the brush member, the coil applying a constant force urging the brush member toward the shielding fixture; and a shunt retainer mounted in the brush chamber and abutting the second end section of the brush member, the shunt retainer including a first leg portion, a second leg portion and a base portion, the shunt retainer being configured to maintain proper alignment of the constant force spring and prevent entanglement of the shunt member.

2. A brush holder assembly for a dynamo-electric machine comprising:

a brush fixture including a main body portion having a first end portion that extends to a second end portion through an intermediate portion defining a brush chamber;

a brush member moveably mounted within the brush chamber, the brush member including a main body member having a first end section that extends to a second end section, the second end section including a shunt member;

a spring including a leg operatively engaged with the brush fixture and a coil that abuts the second end section of the brush, the coil applying a force urging the brush member; and a shunt retainer mounted in the brush chamber and abutting the second end section of the brush member, the shunt retainer including a first leg portion, a second leg portion and a base portion, the shunt retainer being configured to maintain proper alignment of the constant force spring and prevent entanglement of the shunt member.

3. The brush assembly according to claim 2, wherein the shunt retainer is substantially u-shaped in cross-section with the first leg portion being joined to the second leg portion through the base portion forming an interior region.

4. The brush assembly according to claim 3, wherein the shunt retainer includes a first locating element arranged on the first leg portion and a second locating element arranged on the second leg portion, the first and second locating elements being positioned within the interior region and configured to restrain movement of the spring.

5. The brush assembly according to claim 2, wherein the base portion of the shunt retainer includes a recessed portion, the shunt member passing across the base portion in the recessed portion.

6. The brush assembly according to claim 2, wherein the base portion of the shunt retainer includes an alignment member, the alignment member being adapted to substantially prevent movement of the shunt retainer relative to the coil while simultaneously enabling the shunt retainer to travel longitudinally between the first and second end portions within the brush chamber.

7. The brush assembly according to claim 2, further comprising: a cap member snap-fittingly connected to the first end portion of the brush fixture.

8. A brush holder assembly for a dynamo-electric machine comprising:

a brush fixture including a main body portion having a first end portion that extends to a second end portion through an intermediate portion defining a brush chamber;

a shielding fixture detachably mounted to the brush fixture, the shielding fixture including a main body having a first end that extends to a second end through an intermediate wall portion; and a brush member moveably mounted within the brush chamber, the brush member including a main body member having a first end section that extends to a second end section, the second end section including a recessed region and a shunt member, the shunt member including a first end operatively connected to the brush member at the recessed region that extends through an intermediate region to a second end; and a spring including a leg portion connected to the second end portion of the shielding fixture and a coil portion, the coil portion of the spring directly abutting the second end section of the brush member without engaging the shunt member.

9. The brush holder assembly according to claim 8, wherein the recessed region includes a first and second opposing edge portions joined by a base portion to define a substantially u-shaped notch in the second end portion of the brush member.

10. The brush holder assembly according to claim 8, wherein the first end of the shunt member is operatively connected to the brush member at the base portion.

11. The brush holder assembly according to claim 8, wherein the shielding fixture includes a shunt member guide extending, at least in part between the first end portion and second end portion within the brush chamber.

12. The brush holder assembly according to claim 11, further comprising: a terminal element arranged at the first end portion of the brush shield, the shunt member passing along the shunt member guide to the terminal element without touching the spring.

13. The brush holder assembly according to claim 11, further comprising: a cap member snap-fittingly coupled to the first end portion of the shielding fixture, the cap member being adapted to retain the terminal element relative to the brush shield.

* * * * *